United States Statutory Invention Registration [19]

[11] Reg. Number: H858

Leonard et al. [43] Published: Dec. 4, 1990

[54] ELECTRICAL BATTERY CELL WICKING STRUCTURE AND METHOD

[75] Inventors: John F. Leonard, Beavercreek; Stephen Vukson, Tipp City; David H. Fritts, Dayton; Ken Y. Kim, Beavercreek, all of Ohio

[73] Assignee: The United States of America as represented by the Secretary of the Air Force, Washington, D.C.

[21] Appl. No.: 261,804

[22] Filed: Oct. 24, 1988

[51] Int. Cl.[5] ..... H01M 4/36

[52] U.S. Cl. ..... 429/104; 427/123; 427/203

[56] References Cited

U.S. PATENT DOCUMENTS

| | | | |
|---|---|---|---|
| 3,915,741 | 10/1975 | Kogiso et al. | 136/6 FS |
| 4,055,710 | 10/1977 | May et al. | 429/104 |
| 4,076,903 | 2/1978 | Sudworth et al. | 429/104 |
| 4,207,391 | 6/1980 | Church et al. | 204/2.1 |
| 4,307,164 | 12/1981 | Church et al. | 429/207 |
| 4,348,467 | 9/1982 | Wright | 429/94 |
| 4,356,241 | 10/1982 | Wright et al. | 429/104 |
| 4,372,823 | 2/1983 | Church et al. | 204/2.1 |
| 4,381,216 | 4/1983 | Singh | 156/667 |
| 4,439,502 | 3/1984 | Bittihn et al. | 429/104 |
| 4,452,871 | 6/1984 | Bindin | 429/104 |
| 4,759,999 | 7/1988 | Maclachlan et al. | 429/104 |
| 4,797,332 | 1/1989 | Barrow et al. | 429/104 |

*Primary Examiner*—Stephen J. Lechert, Jr.
*Assistant Examiner*—N. Bhat
*Attorney, Agent, or Firm*—Donald J. Singer; Thomas L. Kundert; Gerald B. Hollins

[57] ABSTRACT

An improved capillary action wicking structure and method with a method for its making and with application of the wicking structure to a high temperature electrical battery cell of the sodium/sulfur type. The wicking structure includes finely-divided metal particles of nickel, for example, that are attached to the solid electrolyte structure in the electrical battery cell by an organic binder and sintering combination.

31 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRICAL BATTERY CELL WICKING STRUCTURE AND METHOD

RIGHTS OF THE GOVERNMENT

The invention described herein may be manufactured and used by or for the Government of the United States for all governmental purposes without the payment of any royalty.

CROSS REFERENCE TO RELATED APPLICATIONS

The following patent applications are somewhat related and have the same file date. Some of these applications also include one or more of the present application inventors as a named inventor thereof and are also commonly assigned to the Government of the United States represented by the Secretary of the Air Force. Each of these applications is also hereby incorporated by reference herein. The present application (designated by an *) is included in this list for clarity and completeness of the record.

| Serial Number | | Title |
|---|---|---|
| 07/261,804 | (*) | Electrical Battery Cell Wicking Structure and Method |
| 07/261,803 | | Rigidized Porous Material and Method |
| 07/261,802 | | Alkali and Halogen Rechargeable Cell with Reactant Recombination |
| 07/261,807 | | A Method of Manufacturing Heat Pipe Wicks and Arteries |
| 07/261,809 | | A Method of Manufacturing Heat Pipe Wicks |
| 07/261,808 | | Unidirectional Heat Pipe and Wick |

BACKGROUND OF THE INVENTION

This invention relates to the field of wicking and capillary action as are exemplified, for example, in the combination of liquid and solid elements in an electrical battery cell.

Certain electrical battery cells such as the sodium/-sulfur cell employ structural elements which are not readily wetted by one or more of the battery constituent elements. Such elements are nevertheless often required to have a large area in intimate interface with the non-wetting battery constituent. In the sodium/sulfur battery cell, for example, it is common practice to use a solid-state ceramic electrolyte member for separating the sodium and the sodium reacting battery constituents. In this separation role, ions from the sodium constituent are transmitted through the ceramic electrolyte member in proportion to the wetted surface area interface between the sodium and ceramic materials. Since the electrical resistance and the current delivering capability of such a cell are directly related to this ion transmission capability, the achieved battery characteristics are often limited by ion transmission and the degree of wetting achieved by the cell constituents.

Heretofore, however, the achievement of satisfactory contact between a solid state electrolyte member and a liquid sodium reactant material has been accomplished with some difficulty and has often required the use of electrolyte surrounding structures made from graphite, for example, in order to provide a capillary space adjacent to the electrolyte member in which liquid sodium is communicated.

The difficulty in achieving satisfactory wetting between battery elements such as a ceramic electrolyte member and a liquid sodium constituent member, has also been described in the prior patent art. The patent of M. L. Wright et al. U.S. Pat. No 4,356,241, for example, describes this wetting difficulty and describes operating the battery cell at elevated temperatures, temperatures in excess of 400° C., in order to achieve desirable wetting action. Other arrangements for increasing the wetting action in the sodium/sulfur cell in particular are described in the art recited in the Wright et al patent and in the specification and claims of the Wright et al patent itself. Generally, these arrangements include some form of chemical or physical treatment of the surfaces of the ceramic electrolyte member.

Other resolutions of the wetting difficulty in these cells have included the use of a wick member that is physically separate and distinct from the ceramic electrolyte member—in order to encourage better wetting action and travel of the liquid sodium constituent along the electrolyte member and away from the sodium reservoir.

In many battery arrangements, the provision of a relatively long and possibly wick action travel path for the liquid sodium is also desirable in order that the physical danger of locating sizable quantities of highly reactive materials such as sodium and sulfur in close physical proximity can be decreased. An example of separation arrangements for decreasing the possibility of accidental reaction from sodium/sulfur cell constituents, is to be found in the patent of T. Kogiso et al, U.S. Pat. No. 3,915,741.

The treatment of ceramic materials to achieve other desired conditions in a sodium/sulfur cell, such as low electrical resistance is described in patents represented by that of R. N. Singh, U.S. Pat. No. 4,381,216. The use of finely-divided materials in fabricating an electrical battery cell electrode member is also a known battery cell technique—as is illustrated, for example, in the patent of R. Bittihn et al. U.S. Pat. No. 4,439,502, and the patents of P. K. Church et al U.S. Pat. Nos. 4,207,391, 4,307,164, and 4,372,823.

None of these prior art treatments has, however, provided a fully satisfactory sodium to electrolyte contact arrangement for use in sodium/sulfur cells, and batteries of other nature.

SUMMARY OF THE INVENTION

In the present invention, capillary wicking action is achieved through the use of agglomerated, finely-divided particles that are in supporting physical contact with a substrate member such as the ceramic electrolyte structure of a sodium/sulfur electrical battery cell. When used in the sodium/sulfur battery cell, the invention can be embodied in the form of a finely-divided nickel powder that is sintered to the alumina electrolyte member of the cell following powder supplemented wick slurry or other disposition over the electrolyte surface.

It is an object of the present invention, therefore, to provide an improved capillary action wicking structure that is usable in a battery cell.

It is another object of the invention to provide a battery wicking arrangement which employs a heat-treated agglomeration of metallic particles in the wicking structure.

It is another object of the invention to provide a battery cell powdered metal wicking arrangement which employs metallic particles of small particle sizing.

It is another object of the invention to provide a metallic particle wicking arrangement in which the wicking particles are mildly reactive with a wick-transported battery reactant liquid It is another object of the invention to provide a method for fabricating a battery cell metallic particle wicking member.

It is another object of the invention to provide an improved ceramic electrolyte member for an electrical battery cell such as a sodium/sulfur battery cell.

It is another object of the invention to provide a battery cell sintered nickel wicking member.

It is another object of the invention to provide a battery cell sintered nickel wicking member which employs micron-sized nickel particles in the sintered wicking structure.

Additional objects and features of the invention will be understood from the following description and the accompanying drawings.

These and other objects of the invention are achieved by a sodium electrical battery cell comprising the combination of a solid electrolyte member having first and second surface area portions separated by an ion-transmitting body portion; a sodium-inclusive first reactant material disposed in communication with said electrolyte first surface area portion; a sodium-reacting second reactant material disposed in communication with said second electrolyte surface area portion; and an integrated metallic particle first and second reactant substantially inert wick member disposed intermediate said solid electrolyte member first surface area portion and said metallic sodium first reactant material; said wick member enhancing the wetting of said electrolyte first surface area portion by the liquid phase of said sodium inclusive first reactant material.

DETAILED DESCRIPTION

The wicking structure and method of the present invention may be used with wicks that are applicable to the high-temperature electrical battery cell art, an art that is exemplified by a variety of sodium and sulfur reactant battery cells, for example.

Figure 1:
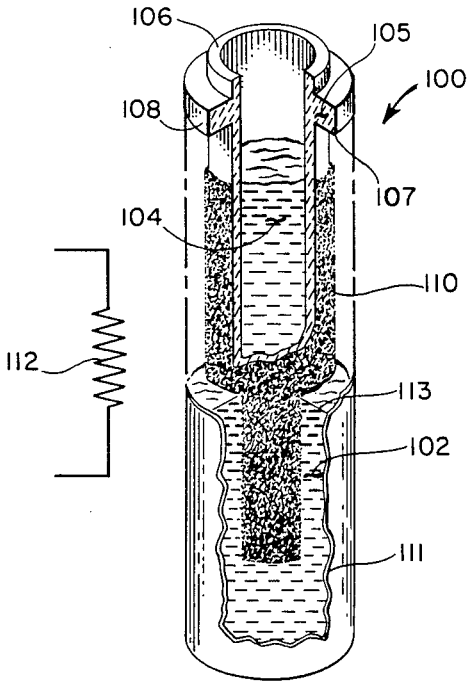
FIG. 1 shows a partial view of a sodium/sulfur battery cell of the type which can advantageously utilize the present invention.

One arrangement of a battery cell that is possibly of this sodium and sulfur reactant material nature is shown in FIG. 1 of the drawings. In the FIG. 1 battery cell 100, there is included a pair of reactant materials which are indicated at 102 and 104 and are separated by an electrically insulating but ion-transmitting substrate or electrolyte member 106. Received on the outermost surface of the electrolyte member 106 in FIG. 1 is a porous textured wick member 110 which serves to enhance the contact between the reactant material 102 and the exterior surface of the electrolyte member 106.

In a battery cell of the FIG. 1 type, the electrolyte member 106 is usually provided with a mounting flange as is indicated at 108 in order that the electrolyte member and its contents be easily retained in an upright position and in sealable connection with the appending structure. During use of the FIG. 1 cell, the reactant materials 102 and 104 are maintained in the liquid state by way of an elevated operating temperature which is the result of thermal energy added by, for example, the electrical heater element 112. At lower temperatures including room temperature, the identified elemental sodium and sulfur reactant materials are disposed in the solid state and are inactive with respect to battery action. Other reactant materials such as are disclosed in the above identified patent application "Alkali and Halogen Rechargeable Cell with Reactant Recombination" can be employed in the FIG. 1 cell when operation at temperatures intermediate these room and elevated temperatures is desired.

Although sodium/sulfur and related battery cells may be fabricated in accordance with the FIG. 1 cell structure with the sodium reactant material disposed internally of the electrolyte member 106, that is, at 104 in FIG. 1, and the sulfur reactant material disposed at 102, the inverse disposition of these reactant materials is also feasible and is contemplated in the FIG. 1 cell. According to this inverse disposition, the sodium reactant material therefore exists at 102 and the sulfur reactant material at 104 The wicking member 110 is provided on the sodium surface of the electrolyte member 106 in recognition of the above-described wetting difficulty between many sodium containing constituents and the beta double-prime ($\beta'$) alumina material that is preferred for the electrolyte member 106. This wicking member is described in greater detail in the paragraphs following.

The battery cell 100 in FIG. 1 is shown in a multiple cutaway perspective view; in this view the upper interior cutting at 105 allows viewing of the reactant material 104 while the outer cutting at 107 allows viewing of the wicking member 110 and the lower cutting at 111 allows viewing of the reactant material 102 and the lower portion of the wicking member 110. As indicated at 113, the outer reactant material 102, the sodium reactant, need not extend the full length of the wicking member 110 in order to achieve full surface area utilization of the electrolyte member 106 with the presence of the present invention wicking member.

As is indicated in the above-referenced patent of Singh. U S. Pat. No. 4,381,216, the $\beta'$ alumina on which the wicking member 110 in FIG. 1 is received is a chemical compound of sodium oxide and aluminum oxide and often employs dopants such as lithium oxide and/or magnesium oxide. The $\beta'$ alumina is desirable for use as a solid ceramic membrane or electrolyte member in electrical battery cells of the FIG. 1 type principally because of its selective ability to transport positively-charged sodium ions in a crystal lattice structure involved transportation mechanism. This transportation arrangement is also a temperature sensitive mechanism.

Electrical connections to the FIG. 1 battery cell reactant materials generally involve one metallic electrode member in contact with the liquid sodium reactant material 102 and a carbon fiber electrode or similar structure that is immersed in the sulfur or sulfur-bearing reactant material 104. The reactant material 104 may, of course, be comprised of elemental sulfur or alternately may be comprised of a chemical compound of sulfur, especially a chemical compound having the physical characteristic of being liquid at moderate temperatures and especially at the temperatures needed to liquefy the sodium reactant material 102. It may also be possible to employ sodium materials having liquefaction characteristics that are more desirable in a battery cell than are the characteristics of elemental sodium, sodium amalgams with mercury and other metals have been employed for this purpose.

Figure 2:
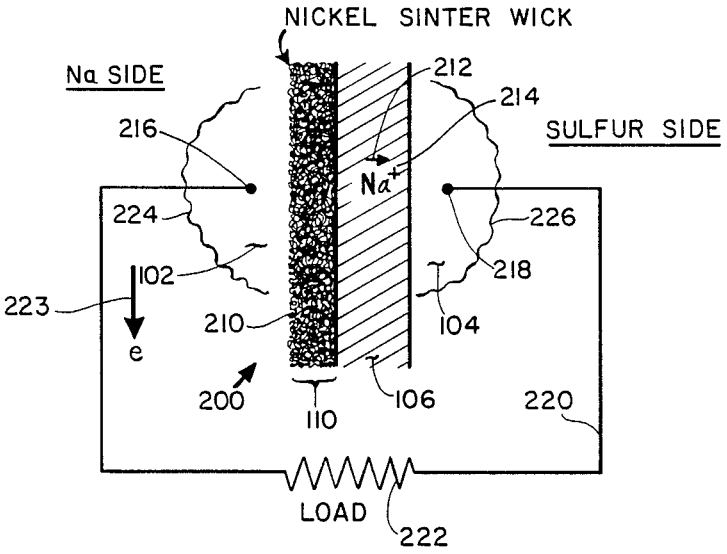
FIG. 2 shows a segment of a cell of the FIG. 1 type in enlarged and partial cross-section.

FIG. 2 of the drawings shows a cross-sectional segment of the FIG. 1 electrical battery cell in a somewhat enlarged and schematic representation. In the FIG. 2 cross-sectional segment 200, the identification numbers used in FIG. 1 are repeated insofar a they are applicable to the FIG. 2 structure and new identification numbers in the 200 series are employed as needed. The FIG. 2 cross-sectional segment 200 therefore includes the sodium reactant material 102 which is shown in representative cutaway fashion as is indicated by the line 224, the sulfur reactant material 104 which is also shown in cutaway form as indicated by the line 226, and the alumina substrate member 106 which has the sintered nickel wicking member 110 disposed on the sodium reactant side thereof. In the FIG. 2 cross-sectional segment 200 the sodium ions which are selectively transported by the alumina electrolyte member 106 are indicated at 214 With the ion movement being indicated at 212. The sodium reactant and sulfur reactant electrodes for the battery of the FIG. 2 segment 200 are indicated at 216 and 218 in FIG. 2 with the electrical load for the cell segment being indicated at 222 and with load coupling to the electrodes 216 and 218 including the electrical conductor 220 and with the load electron or electrical energy flow being indicated at 223.

In the FIG. 2 cross-sectional segment 200, the FIG. 1 wicking member 110 is indicated to be comprised of a number of randomly shaped particles 210 that are shown in somewhat enlarged physical size in the FIG. 2 drawing. For use in an electrical battery cell that employs metallic sodium as a reactant material, the particles 210 are preferably made from nickel, stainless steel or some other metal that is relatively, but preferably, not totally inert with respect to the sodium reactant material 102, as is explained in more detail below. Nickel is, of course, a periodic table Group VIII metal; some other metals such as copper and iron are possible candidates for the wicking member 110—especially in non-sodium cell arrangements.

According to one aspect of the present invention, the presence of the metallic particle wick member 110 in the cell of FIGS. 1 and 2 serves as a conduit for conveying liquid sodium upward along the alumina electrolyte member from a lower sodium reservoir—in the cell arrangement wherein the upper space surrounding the electrolyte member is not completely filled with sodium reactant The wicking arrangement heretofore used typically consists of a graphite foil or other inert material structure that is disposed surrounding the electrolyte member 106 in order that a capillary path between the foil and wick members be provided. The ability of such arrangements to communicate liquid sodium is appreciably less than for the present invention. The wicking structure of the present invention is, for example, found capable of communicating 250° C. to 300° C. liquid sodium over a vertical distance of 10 inches during a time period of 5 to 10 minutes The wicking member 110 by way of its fabrication on and attachment directly to the solid electrolyte member 106, also serves to bring the liquid sodium into the most intimate possible contact with the solid electrolyte member 106. This intimate contact maintains even through periods of differing sodium temperature as might occur, for example, between a higher temperature initial loading of the wicking member 110 and the subsequent lower temperature operating environment of the FIG. 1 and FIG. 2 battery cell. This close, intimate and previously wetted contact between the liquid sodium and the solid electrolyte member 106 is, in fact, believed superior to the contact achieved with direct liquid immersion of the solid electrolyte member 106 in liquid sodium.

By way of this improved intimate or wetting contact between the liquid sodium and the electrolyte member 106, it is found that several cell improvements are achieved. Significantly lower cell operating temperatures, for example, can be employed for a sodium/sulfur battery cell which employs the wicking of the invention. With respect to this improvement, insofar as the sodium material is concerned, operating temperature in the 120° C. range in lieu of the usual 300° C. to 400° C. range for the sodium/sulfur cell are feasible. The decreased ionic conductivity capability of the alumina electrolyte member 106 at such lower operating temperatures is, however, a detraction from operation at such temperatures. Additional advantages attending use of the present invention wicking in a battery cell include the more rapid achievement of steady state operating conditions in an assembled cell, less corrosion by-product formations and increased useful cell operating life.

The particles used in the wicking member 110 of FIGS. 1 and 2 preferably have a size that is below 20 microns in nominal particle diameter—with particles in the 3–5 micron size region being preferable. The use of metallic nickel particles has been indicated above, and is preferred for use of the wicking structure in a sodium/-sulfur battery cell. Nickel powder of this particle size is readily available in the commercial market from the source identified below and others and is, in fact, commonly used in the nickel/cadmium battery cell art, particles made from materials other than nickel, however, including some of the stainless steels such as 300 series stainless, and particles made from other metals such as iron and copper, are possible alternatives for this nickel particulate material in the wicking member of other than sodium/sulfur cells.

A mild chemical-physical reaction is believed to occur between metallic sodium and finely-divided nickel particles used in the wicking member of the invention. This reaction is in the nature of an amalgamation or alloying, and is of a minor (0.004 to 0.20 ppm @ 200° C. to 600° C.) but nevertheless beneficial nature in enhancing the wick action conveyance of sodium material into the intimate wetting contact desired with the electrolyte member 106. The resulting erosion of nickel particles and formation of reaction by-products are of little consequence in the operating life or operating cycles of the battery cell—i.e. cell life is determined by other practical considerations which become operative before the cumulative results of this chemical-physical reaction.

As is described below in connection with FIGS. 3 and 4, the particles of the wicking member 110 are fixed in relative position and fixed in attachment to the electrolyte member 106 by way of a heat related process which can be generically called a "heat petrification" process. More specifically, the particles are preferably first held in agglomeration and in contact with the solid electrolyte member 106 through use of an organic binder material and then permanently rigidized by a sintering heat process.

Figure 3:
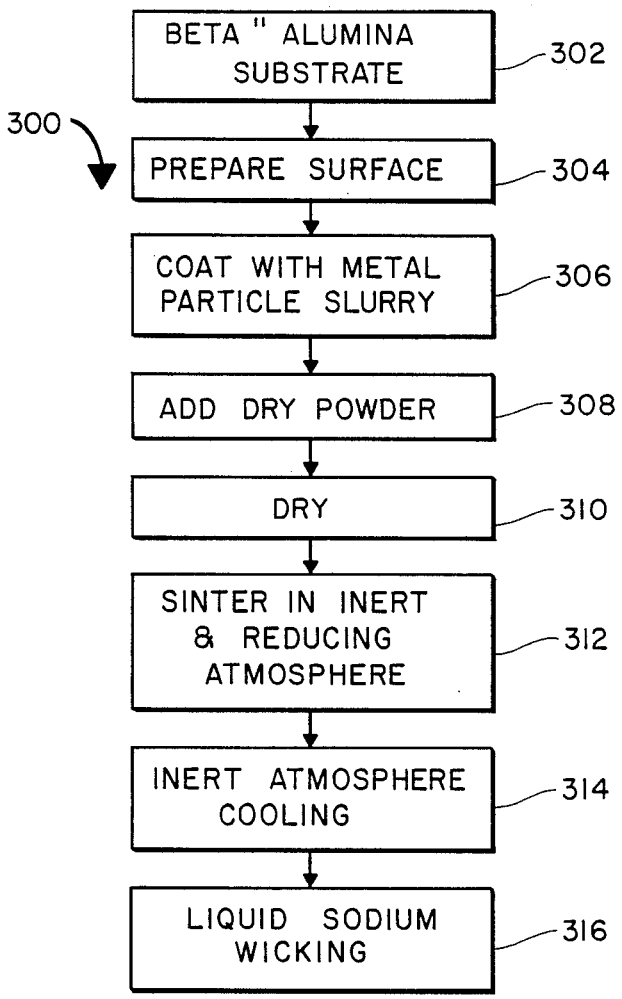
FIG. 3 shows a method of making sequence for fabricating a capillary action wicking member that is usable in the FIG. 1 battery cell.

FIG. 3 in the drawings shows a sequence of processing steps 300 by which the FIG. 1 and FIG. 2 illustrated sodium electrode and wick assembly can be fabricated. As indicated at 302 in FIG. 3, the processing sequence commences with a beta double prime alumina substrate that is shaped in the manner of the electrolyte member 106 in FIG. 1 or is of some other convenient electrolyte member shape. The substrate is prepared for receiving the wicking member 110 by way of an etching of the alumina surface, as is indicated at 304 in FIG. 3. The etching of the step 304 can be accomplished by alumina exposure to water at a temperature of 20° C. and for a period of 1 to 2 minutes, or in a more rapid manner by exposure of the alumina surface to an alkali hydroxide such as sodium hydroxide of, for example, aqueous-based 1.0 normal concentration. An exposure time of less than one minute at temperatures of 20° C. to 50° C. is found to be satisfactory for the alkali hydroxide accomplished etching. $\beta'$ alumina electrolyte substrate members suitable for use in sodium/sulfur cells of the type indicated in FIGS. 1 and 2 are available from Ceramatec Incorporated of Salt Lake City, Utah, using the manufacturer's identification of beta double prime alumina electrolyte elements.

Coating of the substrate surface with a metallic particle slurry is indicated in the step 306 of FIG. 3. The method of accomplishing this coating is somewhat dependent upon the shape of the electrolyte member being coated and upon the internal surface or external surface nature of the coated area. For the arrangement indicated in FIG. 1 where the wicking member 110 is to be disposed on an external surface of the substrate member, the coating of step 306 may be accomplished by brush application of the particle slurry directly on the electrolyte surface with supplementing by the sprinkling of additional metallic particle dry powder over the slurry wetted surface, as is indicated at 308 in FIG. 3. For such a fabrication arrangement, the applied slurry may have a viscosity in the range of 500 to 1000 centistokes as measured at room temperature with, for example, a Cannon-Fenske Opaque (reverse flow) Viscosimeter, and with a viscosity value near the 750 centistokes center of this range being preferred.

The slurry applied to the electrolyte substrate member may consist of alcohol, such as ethyl alcohol, added to a 3 to 5 micron sized nickel particle powder such as the International Nickel type 255 MOND metal powder or the type NI228, NI227 or NI172 powders of three microns, one hundred fifty microns and seventy-five micron sizes respectively that are available from Atlantic Equipment Engineers Inc. of Bergenfield, N.J. The metal particle slurry also includes a dissolved organic binder material such as the Methocel powder that is available from Dow Corning Corporation or the polyox water soluble resin, that is available from Union Carbide Corporation. The Methocel binder material includes methyl cellulose while the polyox resin material includes nonionic poly (ethylene oxide) homopolymers. Preparation of the binder with either alcohol, water, or with a mixture of these solvents or other solvents may be in accordance with the manufacturer's recommendations with minor optimization for the present environment. Other organic binder materials as are known in the chemical art may readily be substituted in the FIG. 3 sequence.

The block 306 in FIG. 3 may be replaced by other arrangements of slurry to alumina contact such as flowing the slurry over an internal substrate surface area or dipping an external area into a slurry reservoir, as are known in the processing arts. The addition of dry powder as indicated at 308 in FIG. 3 has been found to increase the achievable "green" or wet wick thickness over that which can be achieved with slurry application alone.

The green nickel wicking member from the particle application steps 306 and 308 is dried, as indicated in the block 310 in FIG. 3, using a vacuum drying or air drying sequence at temperatures in the range of 20° C. to 50° C. and for time periods in the range of 6 to 24 hours.

Following the drying operation, the green wicking member and substrate member are fired in a reducing atmosphere furnace at temperatures which are preferably in the 900° C. to 1000° C. range for a period on the order of 5 minutes following the attainment of temperature. The atmosphere in the furnace is preferably reducing in nature by the addition of hydrogen in the concentration of 4 to 5 percent, or by adding other reducing gases as are known in the art, to an otherwise inert atmosphere of helium, argon or nitrogen.

In view of a tendency for the reducing gas to attack a sintered wicking member at temperatures in the 800° C. range during a cooldown sequence, the furnace atmosphere is preferably changed to a purely inert gas composition just prior to the cooldown sequence. Cooldown is indicated at 314 in FIG. 3. Cooldown is believed to be non-critical in nature, but is nevertheless accomplished according to a predetermined temperature decrease profile of 200° C. per hour. The completed wicking member may have a post-sintering thickness in the range of 0.020 to 0.080 inches or 0.5 to 2.0 millimeters.

The introduction of liquid sodium to the cooled wicking member is indicated in the block 316 in FIG. 3 and generally involves exposure of the wicking structure to metallic sodium that is held in the temperature range of 250° C. to 300° C. This introduction may, of course, be part of assembling the battery cell 100 in FIG. 1 or may be accomplished in advance of the assembly operation. Complete introduction of the sodium into the wicking member 110 requires some period of time and, for example, has been found to occur in a period of 5 to 10 minutes for a solid electrolyte member that is 10 inches in length.

The improved wicking structure described herein can be advantageously employed in both a secondary or rechargeable electrical battery cell as well as in a primary or one-time use electrical battery cell. Additionally, the cell can be of the different varieties that ar known in the battery art in addition to the referred-to sodium cell.

By way of the above description involving a particular electrical battery cell embodiment, there has been described an improved wicking apparatus and method which may be utilized in a wide variety of battery cell arrangements.

While the apparatus and method herein described constitute a preferred embodiment of the invention it is to be understood that the invention is not limited to this precise form of apparatus or method, and that changes may be made therein without departing from the scope of the invention, which is defined in the appended claims.

We claim:

1. A sodium electrical battery cell comprising the combination of:

a solid electrolyte member having first and second surface area portions separated by an ion-transmitting body portion;

a sodium-inclusive first reactant material disposed in communication with said electrolyte first surface area portion;

a sodium-reacting second reactant material disposed in communication with said second electrolyte surface area portion; and an integrated metallic particle first and second reactant substantially inert wick member disposed intermediate said solid electrolyte member first surface area portion and said metallic sodium first reactant material;

said wick member enhancing the wetting of said electrolyte first surface area portion by the liquid phase of said sodium inclusive first reactant material.

2. The electrical battery cell of claim 1 wherein said solid electrolyte member is comprised of alumina.

3. The electrical battery cell of claim 2 wherein said electrolyte alumina comprises sodium containing beta double prime alumina.

4. The electrical battery cell of claim 1 wherein said wick member comprises heat petrified metallic particles.

5. The electrical battery cell of claim 4 wherein said wick member comprises sintered metallic particles.

6. The electrical battery cell of claim 4 wherein said wick member particles have a physical size in the range of two to ten microns.

7. The electrical battery cell of claim 6 wherein said wick member particles have a physical size in the range of three to five microns.

8. The electrical battery cell of claim 4 wherein said metallic particles are composed of an alloy metal.

9. The electrical battery cell of claim 8 wherein said metallic particles are comprised of a periodic table group VIII elemental metal.

10. The electrical battery cell of claim 9 wherein said elemental metal is nickel.

11. The electrical battery cell of claim 4 wherein said metallic particle wick member is disposed over and supported by said alumina electrolyte first surface area portion.

12. The electrical battery cell of claim 1 wherein said first reactant material is metallic sodium.

13. The electrical battery cell of claim 12 wherein said second reactant material includes the element sulfur.

14. The electrical battery cell of claim 13 wherein said second reactant material is elemental sulfur.

15. The electrical battery cell of claim 14 wherein said electrolyte member is cylindrical in shape with one of said reactant materials being disposed internal of said cylindrical shape and one disposed external of said cylindrical shape.

16. The electrical battery cell of claim 15 wherein said metallic sodium first reactant material is disposed external of said cylindrically shaped electrolyte member.

17. The method of fabricating a wicked solid state electrolyte member and wicked reactant assembly for a high-temperature sodium electrical battery cell comprising the steps of:

coating one surface of an elongated closable beta double prime alumina solid electrolyte member with a wet slurry of finely divided metal particles and organic binder;

dusting the wet surface of the said slurry coating with a coating thickening additional layer of said finely divided metal particles;

drying the thickened metallic particle coating until rigidized into an electrolyte member attached wicking member;

sintering the wicking member;

wetting the wicked electrolyte member surface with liquid sodium.

18. The method of claim 17 wherein said dusting step is continued until the exposed coating surface is unable to retain additional of said metal particle material.

19. The method of claim 18 wherein said solid electrolyte member includes a tubular portion and wherein said slurry coating is applied to the tubular exterior surface.

20. The method of claim 19 wherein said wetting step includes immersing a portion of said electrolyte member in liquid sodium.

21. The method of claim 18 wherein said finely-divided metal particles have a nominal particle size of less than twenty microns.

22. The method of claim 21 wherein said finely-divided metal particles have a nominal particle size of three to five microns.

23. The method of claim 22 wherein said finely-divided metal particles are comprised of an elemental metal.

24. The method of claim 23 wherein said metal is in group VIII of the periodic table.

25. The method of claim 23 wherein said metal is taken from the group consisting of nickel, copper and iron.

26. The method of claim 25 wherein the liquid of said slurry is taken from the group comprising water and alcohols.

27. The method of claim 17 wherein said sintering step includes temperatures above seven hundred fifty degrees centigrade.

28. The method of claim 17 wherein said sintering step includes a reducing atmosphere.

29. The method of claim 28 wherein said sintering step includes an inert gas majority portion above ninety percent and at least four percent of hydrogen.

30. The method of claim 28 wherein said sintering step includes a one thousand degree inert gas reducing atmosphere during the initial and central time portions thereof and an inert gas neutral atmosphere during the cooldown terminal portion thereof.

31. A wicked solid state electrolyte member for a sodium sulfur electrical battery cell comprising the combination of:

a closed end tubular electrolyte substrate member comprised of sodium inclusive beta double prime alumina material;

a finely-divided metallic nickel wicking member disposed over one of the interior surface and exterior surface portions of said substrate member;

said wicking member being disposed on the anode side of said substrate member and comprising sintered metallic nickel particles of a nominal size between three and five microns; and a metallic sodium impregnant received during a liquid state thereof in the inter metallic nickel particles void spaces of said wicking member.

* * * * *